United States Patent Office 3,284,178
Patented Nov. 8, 1966

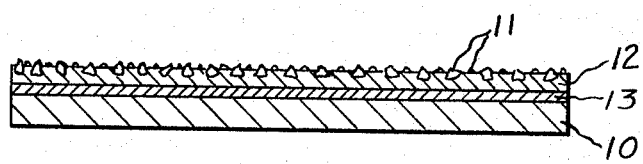

3,284,178
METAL BACKED ABRASIVES
William F. Timmer, Cohoes, and Nolan A. Curry, Troy, N.Y., assignors to Norton Company, Troy, N.Y., a corporation of Massachusetts
Filed June 20, 1963, Ser. No. 289,264
3 Claims. (Cl. 51—297)

The present invention relates in general to metal backed abrasive articles and more particularly to a special type of primer or tie-coat used as a component of such articles.

Generally it has been considered difficult and impractical to utilize metal backings as the supporting media for adhesive-bonded abrasives. In order for the abrasive articles to function properly in their cutting or abrading action, the adhesive bond required must be fairly hard and brittle. Unsatisfactory adhesion of such adhesive bonds to metal have precluded their use commercially to any appreciable extent. Also, such products produced experimentally with the hard, rigid adhesive bonding the grain also being the bond between the metal and the abrasive have shown failures due to unequal expansion and contraction of the two materials at the interface thereof.

Abrasive products made with adhesive-bonded abrasive grains coated on metal backings have potential as hones, grinding wheels, abrading discs and saw blades among other uses. Attempts to use conventional metal primers such as epoxy resins have failed due to the tendency of such primers to soften under the heat generated in grinding and abrading operations.

It is therefore an object of the present invention to provide a satisfactory metal backed, coated abrasive product.

Another object of the present invention is to provide an improved primer or tie-coat for such abrasive articles.

Additional objects, if not specifically set forth herein, will be readily apparent to one skilled in the art from the following detailed description of the invention.

In the drawings:

The drawing is an enlarged cross-section of a hone made in accordance with the present invention.

Generally, the present invention comprises the formation of an abrasive article of any desired type or shape utilizing a metal backing member of any desired shape or thickness, i.e. the metal may be thin and flexible or thicker and rigid as desired. To this metal backing member is adhesively bonded at least a single layer of abrasive grain such as diamond grit, silicon carbide, aluminum oxide, garnet or the like. The adhesive used to bind the grain is any of the usual "making" resins used in and well known to the coated abrasive art. Suitable adhesives are phenolformaldehyde resin-based adhesives, but any other hard, strong, rough resinous adhesives capable of holding the grains during abrading operations may be used as desired.

Interposed between the abrasive grain layer and the metal backing is a special primer, pre-size or tie-coat which serves to coat the metal backing member and provide a firm anchorage between the metal and the adhesive used to bind the abrasive grain. This presize coating is formed of a blend of alcohol-soluble nylon with a thermosetting, alkali-catalyzed preferably unmodified phenol-formaldehyde resin. The ratio of nylon to phenolic may range from 95:5 to 45:55 for the more flexible metal backings. Where more rigid backings are used, the nylon:phenolic ratio may drop to as low as 1:4.

The preferred alcohol-soluble nylons used in this invention are the so-called "interpolymer nylons" or filament-forming interpolyamides. Interpolymer nylons or filament-forming interpolyamides used in carrying out this invention are limited to those having suitable intrinsic viscosities (0.4 or higher) and are the reaction product of at least three polyamide-forming reactants of which (a) one is a diprimary diamine containing at least 6, but not more than 14, carbon atoms; (b) one is a dibasic carboxylic acid containing at least 6, but not more than 12, carbon atoms; and (c) one is polyamide-forming material composed of at least one additional reactant different from the two others selected as defined in (a) and (b), which third reactant is, however, selected from other diprimary diamines defined in (a), or other dibasic carboxylic acids defined in (b), or from the polymerizable amino acids or from mixtures of two or more of such different diprimary diamines, such different acids and said amino acids. One very suitable nylon of this type is a terpolymer of hexamethylene adipamide, hexamethylene sebacamide and aminocaproic acid.

Other alcohol-soluble nylons useful in this invention are those having the functional group:

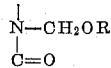

wherein R is the organic radical derived from the alcohol used in forming the functional group as described in United States Letters Patent No. 2,430,923 to Foster et al.

Whereas methyl alcohol is most frequently used and hence there is thereby introduced an organic radical having one carbon atom, alcohols which introduce radicals having a greater number of carbon atoms may be used as, for example, ethanol, propanol, isopropanol and butanol. If a mixed alkoxymethyl derivative is desired, a mixture of alcohols can be used or different alcohols may be added at different stages of the manufacture of the alcohol-soluble nylon. The N-alkoxymethyl nylons or filament-forming polyamides which may be used in this invention preferably have a dilution value of 33 or more when the dilution value is determined by the method disclosed in the aforementioned Foster et al. patent (column 3, lines 25-39) but it has been found that the intrinsic viscosity as hereinafter defined is a better and more generally applicable guide than dilution values in the selection of nylons or filament-forming polyamides for use in the present invention. While suitable nylons for use in this invention are commercially available from E. I. du Pont de Nemours & Company, Wilmington, Delaware, U.S.A., such nylons may be prepared as illustrated in the following specific example:

Three parts of 90% formic acid (sp. gr.=1.2) is charged into a glass resin reaction flask equipped with a stirrer, 1 part of nylon marquisette (polyhexamethylene adipamide) cut in very small pieces is added, the mixture is heated to 60° C. and solution is complete within 60 minutes. A second solution consisting of 0.933 part of paraformaldehyde (95% aldehyde), 1 part of methanol and 0.0006 part of sodium hydroxide is prepared at 60° C. in an open glass beaker and 0.5 part of methyl formate is added. This second solution is added to the polyamide solution over a 3½ minute period with good agitation. The reaction mixture is maintained at 60° C., and 8 minutes after all the aldehyde solution has been added 1 part of second-stage methanol is added to the reaction mixture. Seventeen minutes later (25 minuntes after all the aldehyde solution has been added) 2 parts of third-stage methanol is added and 5 minutes later the reaction mixture is discharged into a precipitation vessel containing 28 parts of cold aqueous acetone (44% acetone by weight). The resulting solution is stirred vigorously and neutralized with aqueous ammonia. The product, N-methoxymethyl polyhexamethylene adipamide, precipitates in finely divided, free-settling, granular form. It is separated from the mother liquor by decantation and washed by reslurrying with water. The decanted precipitate is dried in a vacuum at 50° C.

Instead of polyhexamethylene adipamide, other polyamides such as polyhexamethylene sebacamide or those derived from epsilon-aminocaproic acid, which are readily available commercially, may be used.

The N-alkoxymethyl polyamides and the interpolyamides and mixtures of the former and the latter suitable for use in the present invention have an intrinsic viscosity of 0.4 or more.

Intrinsic viscosity V(int.) for purposes of this invention, and in accordance with the practice of those skilled in the art, is the limit as $c$ goes to $o$ of $V(sp.)/c$ wherein $c$ is the concentration and wherein $V(sp.)$ is the specific viscosity and is given by the equation:

$$V(sp.) = \frac{\text{flow time of solution} - \text{flow time of solvent}}{\text{flow time of solvent}}$$

From tabulated data, $V(sp./c)$ is plotted against $c$ and a straight line is drawn through the points in such a way as to intersect the $V(sp./c)$ axis. This extrapolated value of $V(sp./c)$ at zero concentration is the "intrinsic viscosity" as the term is used herein.

Methods of measuring the intrinsic viscosity are well known in the art and the following procedure has been used with success:

The polyamides in the form of small (1/8" x 1/8") cubes are weighed out to 0.1 mg. as 0.35, 0.5 and 0.75 gram samples and transferred to glass-stoppered bottles, to each of which exactly 100 ml. of 80% formic acid was added. Several hours were required for solution to become complete, and in some instances the solutions were allowed to stand overnight at room temperature.

Into an Ostwald-Fenske viscometer having a capillary bore of 0.6 mm., 6.4, ml. of solution was added by pipette, the viscometer placed in a constant temperature bath at 25°±0.05° C. and the apparatus allowed to come to equilibrium. Flow times were measured to 0.1 second by means of a stopwatch in the usual manner, and the average of at least three readings was used in the calculations. The flow time of the solvent was likewise determined under the same conditions.

The resin used in the presize of the present invention is, as aforesaid, a thermosetting, alkali-catalyzed resin made from unsubstituted phenol. The ratio of formaldehyde to phenol may vary from 0.95:1 up to 2:1 with the preferred ratio being 1.7:1. While these resins are preferably unmodified, such term as used herein is intended to include minor modifications which do not affect the operability of the resin in the blend.

Referring to the drawing it will be seen that the metal backing 10 is separated from the abrasive grain 11 and the hard, resinous bond 12 therefore by the interposed nylon-phenolic presize coating 13. While adequate adhesion of the presize to the metal (usually steel although other metals may be used if desired) is achieved by merely cleaning the metal surface prior to coating with the presize material, it is sometimes desirable to surface etch the metal with acid or to sandblast the metal surface to improve adhesion for severe abrading operations.

The coating operations may be carried out in any of the conventional and well-known manners and the metal articles may be individually coated or cut or dried out from a strip or other larger coated surface. The presize coating should be applied in a thickness ranging from about .0001 inch to .005 inch. The abrasive coating is applied in the same manner as for any other coated abrasive product and, of course, may carry a sand-size coat or coats in addition to the maker coat of adhesive is desired.

The presize of the present invention also finds use as a saturant for conventional coated abrasive backings as covered in our copending application Serial No. 216,-347, filed August 13, 1962.

We claim:
1. An abrasive article comprising: a metal backing member; a presize coating having a thickness of from 0.0001 inch to 0.005 inch adhered to one surface of said metal backing, said presize coating consisting essentially of a reaction product of alcohol-soluble nylon having an intrinsic viscosity of at least 0.4 with a thermosetting, alkali-catalyzed unmodified phenol-formaldehyde resin, the ratio of nylon to resin ranging from 19:1 to 1:4; and a plurality of abrasive grains adhesively bonded to said presize coating.

2. An article as in claim 1 wherein said alcohol-soluble nylon is an interpolymer nylon.

3. An article as in claim 1 wherein the ratio of alcohol-soluble nylon to thermosetting resin in said reaction product ranges from 95:5 to 45:55.

References Cited by the Examiner

UNITED STATES PATENTS

| | | | |
|---|---|---|---|
| 2,595,733 | 5/1952 | Tone et al. | 51—298 |
| 2,891,023 | 6/1959 | Peerman et al. | |
| 2,937,934 | 5/1960 | Nefflen | 51—298 |

MORRIS LIEBMAN, *Primary Examiner.*

D. J. ARNOLD, *Assistant Examiner.*